US006615247B1

(12) United States Patent
Murphy

(10) Patent No.: US 6,615,247 B1
(45) Date of Patent: Sep. 2, 2003

(54) SYSTEM AND METHOD FOR CUSTOMIZING REQUESTED WEB PAGE BASED ON INFORMATION SUCH AS PREVIOUS LOCATION VISITED BY CUSTOMER AND SEARCH TERM USED BY CUSTOMER

(75) Inventor: Stephen C. Murphy, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/345,759

(22) Filed: Jul. 1, 1999

(51) Int. Cl.[7] ................................................ G06F 15/16
(52) U.S. Cl. ...................... 709/217; 709/219; 709/225; 705/26; 705/27
(58) Field of Search ................................. 709/217, 219, 709/225; 705/26, 27; 707/3, 4, 500

(56) References Cited

U.S. PATENT DOCUMENTS 4,977,594 A   12/1990   Shear
5,247,517 A    9/1993   Ross et al.

(List continued on next page.)

OTHER PUBLICATIONS

US 2002/0002571 A1*
Pub. No. US 2002/0007307 A1.*
Pub. No. US 2002/0004754 A1.*
Barry Nancy, "The Searchable Kingdom," Byte Magazine, vol. 22, No. 6, Jun. 1997.
http://www.olms.com/nielsen...nl, Online Marketing Solutions, Nielson Report, Reported Dec. 1995, accessed Mar. 18, 1998.
http://software.infoseek.com/products/ultraseek/ultrafeatures.htm, Ultraseek Server Detailed Feature List, Accessed Apr. 9, 1998.
U.S. patent application Ser. No. 08/985,155, Fleming, filed Dec. 4, 1997.
U.S. patent application Ser. No. 08/994,836, Fleming, filed Mar. 22, 2000.
http://www.altavista.digital.com/av/content/help_advanced.htm, Alta Vista Search Help: Advanced Form, accessed Apr. 9, 1998.
http://www.altavista.digital.com/av/content/help_refine.htm, Alta Vista Search Refine Help: HTML Version of . . . , accessed Apr. 9, 1998.
http://www.altavista.digital.com/av/content/help.htm, Alta Vista Search HELP, accessed Apr. 9, 1998.

*Primary Examiner*—Nabil El-Hady
(74) *Attorney, Agent, or Firm*—Perkins Coie LLP

(57) ABSTRACT

A method and apparatus for automatically customizing a vendor's web site, based on a web site customer's previous location or terms used in a search by the customer, to provide incentives for the customer to remain on that vendor's web site and purchase goods or services from that vendor is disclosed. When a customer lands on a vendor's web site, the customer's web browser reports the referring Universal Resource Locator (URL) to the vendor's web site. The URL is parsed and examined by the vendor's web site to determine the web site the customer previously was visiting or, if directed to the vendor's web site by a search engine, the terms used by the customer for the search. The terms included in the referring URL are compared with terms previously stored in a database. If any of the terms in the referring URL match a term stored in the database, the vendor's web page can be customized with special promotional offers, such as a coupon, or links to the other web pages related to the information retrieved from the parsed URL.

27 Claims, 2 Drawing Sheets

U.S. PATENT DOCUMENTS

| | | |
|---|---|---|
| 5,315,580 A | 5/1994 | Phaal |
| 5,627,886 A | 5/1997 | Bowman |
| 5,638,443 A | 6/1997 | Stefik et al. |
| 5,675,510 A | 10/1997 | Coffey et al. |
| 5,682,525 A | 10/1997 | Bouve et al. |
| 5,706,502 A | 1/1998 | Foley et al. |
| 5,708,780 A | 1/1998 | Levergood et al. |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,567 A | 3/1998 | Rose et al. |
| 5,751,956 A | 5/1998 | Kirsch |
| 5,761,662 A | 6/1998 | Dasan |
| 5,787,253 A | 7/1998 | McCreery et al. |
| 5,796,952 A | 8/1998 | Davis et al. |
| 5,812,642 A | 9/1998 | Leroy |
| 5,812,769 A | 9/1998 | Graber et al. |
| 5,819,047 A | 10/1998 | Bauer et al. |
| 5,835,087 A | 11/1998 | Herz et al. |
| 5,848,396 A | 12/1998 | Gerace |
| 5,872,850 A | 2/1999 | Klein et al. |
| 5,875,296 A | 2/1999 | Shi et al. |
| 5,901,287 A | 5/1999 | Bull et al. |
| 5,918,014 A * | 6/1999 | Robinson ..................... 706/12 |
| 6,014,638 A * | 1/2000 | Burge et al. ................... 705/27 |
| 6,052,730 A * | 4/2000 | Felciano et al. ............ 709/225 |
| 6,128,663 A * | 10/2000 | Thomas ..................... 709/217 |
| 6,185,614 B1 * | 2/2001 | Cuomo et al. ........... 707/104.1 |
| 6,321,256 B1 * | 11/2001 | Himmel et al. ................ 705/14 |
| 6,338,059 B1 * | 1/2002 | Fields et al. .................. 707/10 |

* cited by examiner

SYSTEM AND METHOD FOR CUSTOMIZING REQUESTED WEB PAGE BASED ON INFORMATION SUCH AS PREVIOUS LOCATION VISITED BY CUSTOMER AND SEARCH TERM USED BY CUSTOMER

BACKGROUND OF THE INVENTION

1. Field of the Invention

The present invention relates to on-line communication systems, and more particularly to a system and method for automatically customizing a web page on the World Wide Web based on information relating to a previous web page visited by a user or search terms input by the user.

2. Description of the Related Art

In recent years, the amount of commerce being conducted using distributed networks of computers, such as the Internet, has substantially increased. Many businesses typically provide an Internet site on the World Wide Web (WWW) to promote their products and services. These sites allow the merchant to economically reach a vast number of potential customers with very little cost. Additionally, customers are able to review merchandise and services from a large number of vendors simply with a few key strokes of their computer and clicks of the mouse.

FIG. 1 illustrates an example of a system in which a customer can utilize the World Wide Web to browse various web sites. A user terminal 10, such as for example a personal computer or other data processing device, is coupled to the Internet 14 via an Internet provider gateway 12. Interfaces between user terminal 10 and gateway 12 are well known in the art, and typically include a modem (not shown) or other gateway provider connection. The user terminal 10 may be employed by a user to search the WWW with a web browser in a conventional manner and communicate with one or more remotely located web servers 16, 17. Representative browsers include, among others, Netscape Navigator, Microsoft Internet Explorer or the like. While only two web servers 16, 17 are shown, it is to be understood that the World Wide Web is a collection of a number of web servers of the Internet. Each web server 16, 17 supports clients, such as vendors, and provides information via numerous web sites. Each web site is maintained and used by a specific vendor to advertise different products or services from that vendor. Each web site may consist of one or more web pages, such as Active Server Pages (ASPs), in which the different products or services are advertised similarly to pages of a conventional catalogue. Each web server 16, 17 may support a web site for one or more vendors.

In the WWW environment, user terminal 10 effects transactions to web servers 16, 17 using the Hypertext Transfer Protocol (HTTP), which is a known application protocol providing users access to files, e.g., text, graphics, images, sound, video, etc., using a standard page description language known as Hypertext Markup Language (HTML). HTML provides basic document formatting and allows the developer to specify "links" to other servers and files. Within the Internet, a network path to a web server is identified by a Universal Resource Locator (URL), which defines an electronic path to a resource such as a file, program, directory or web site on the Internet. Use of an HTML-compatible browser (e.g., Netscape Navigator) at user terminal 10 involves specification of a link via the URL. In response, the user terminal 10 makes a request to the server identified in the link, such as for example server 16, and receives in return a document formatted according to HTML.

Although the popularity of the Internet has provided tremendous potential for vendors to market goods and services, for some companies advertising their wares and services through a web site on the Internet has not proven to be very effective. One of the difficulties with advertising on the Internet is directing consumers to visit a particular web site. The overabundance of web site locations has created an information overload for many consumers. The information overload may cause consumers to quickly scan only the first web page they land on in a first web site and move on to a second web site without ever exploring other web pages within the first web site. This could result in a loss of customers to other vendors and a resulting loss in sales.

It would be beneficial for a vendor to be able to customize his web site, and particularly the web page, on which a web customer lands to provide some incentive for the customer to remain in the vendor's web site and to purchase goods and/or services from that vendor. This would be especially beneficial if the tracking of the navigational path of the customer indicates the customer has just come from a competitor's web site or was brought to the web site by a search engine, and thus may be comparison shopping for a product or service. Tracking of navigational paths on the WWW is known in the art. For example, for a description of tracking of navigational paths, reference is made to U.S. Pat. No. 5,717,860, entitled "Method and Apparatus for Tracking the Navigation Path of a User on the World Wide Web" and U.S. Pat. No. 5,712,979, entitled "Method and Apparatus for Attaching Navigational History Information to Universal Resource Locator Links on a World Wide Web." These references are expressly incorporated by reference herein.

Thus, there exists a need for a system and method of customizing a web page in a vendor's web site, based on a customer's previous location or terms used in a search, to provide incentives for the customer to remain in that vendor's web site and purchase goods and/or services from that vendor.

SUMMARY OF THE INVENTION

The present invention provides a method and apparatus for automatically customizing a web page in a vendor's web site, based on a customer's previous location or terms used in a search by the customer, to provide incentives for the customer to remain in that vendor's web site and purchase goods and/or services from that vendor.

When a customer lands on a vendor's web site, the customer's web browser reports the referring Universal Resource Locator (URL) to the vendor's web site. In accordance with the present invention, the URL is parsed and examined by the vendor's web site to determine the web site the customer previously was visiting or, if directed to the vendor's web site by a search engine, the terms used by the customer for the search. The terms included in the referring URL are compared with terms previously stored in a database. If any of the terms in the referring URL match a term stored in the database, the vendor's web page can be customized with special promotional offers or coupons related to the information retrieved from the parsed URL. This customization increases the chances of retaining the customer in the web site and inducing the customer to make a purchase of goods and/or services from that vendor.

These and other advantages and features of the invention will become apparent from the following detailed description of the invention which is provided in connection with the accompanying drawings.

DETAILED DESCRIPTION OF PREFERRED EMBODIMENTS

The present invention will be described as set forth in an embodiment illustrated in FIGS. 2–3. Other embodiments may be utilized and structural, logical, or programming changes may be made without departing from the spirit or scope of the present invention.

In accordance with the present invention, a web page on a vendor's web site can be automatically customized based on a customer's previous location or terms used in a search by the customer to provide incentives for the customer to remain on that vendor's web site and purchase goods and/or services from that vendor.

Figure 1:
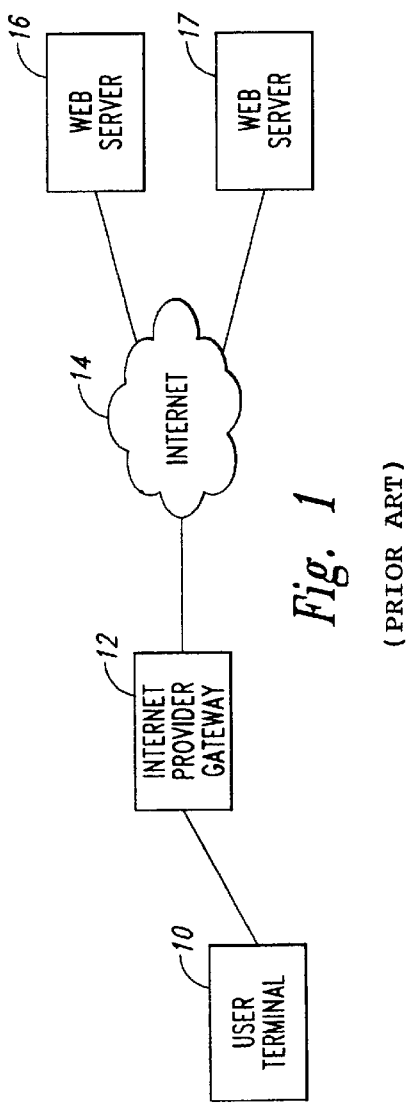
FIG. 1 illustrates an example of a prior art system in which a customer can utilize the World Wide Web to browse various web sites.
Figure 2:
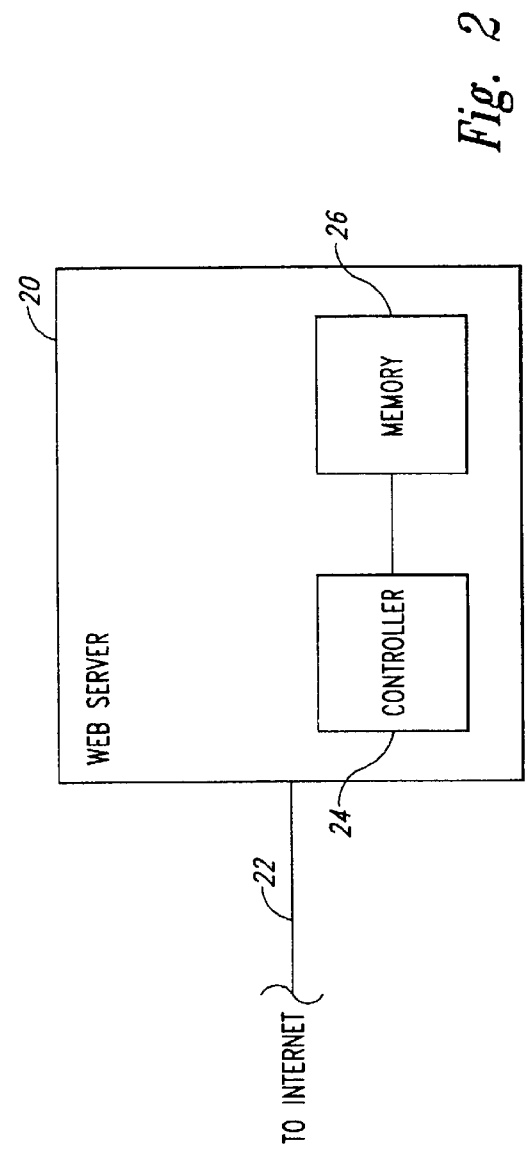
FIG. 2 is a block diagram of an embodiment of a web server that can be used to automatically customize web pages in accordance with the present invention.

FIG. 2 illustrates a web server 20 that can be used to automatically customize web pages in accordance with one embodiment. Web server 20 includes a controller 24 connected to a memory 26. Controller 24 may include a microprocessor. The microprocessor may by any conventional general purpose single- or multi-chip microprocessor. In addition, the microprocessor may be any conventional special purpose microprocessor such as a digital signal processor or a graphics processor. Web server 20 is connected to the Internet via link 22.

When a customer arrives at a vendor web site supported by web server 20, the customer's browser reports the referring URL to web site 20, thus allowing web server 20 to track the navigation path of the customer on the WWW. In accordance with the present invention, when the referring URL is reported to web server 20, controller 24 parses the referring URL and examines the parsed URL. For example, if a customer at the web site on web server 20 came from a site with the address "www.compaq.com," the referring URL of "www.compaq.com" will be reported to web server 20. Controller 24 will parse the referring URL into its constituent terms, i.e., "www," "compaq," and "com," and extract the specific address name of the site, in this example "compaq." Controller 24 will then compare the extracted address name to a list of names and terms stored in a database in memory 26. The names stored in database in memory 26 are predetermined and can be based, for example, on the address names of competitor's web sites.

If a match is made between the referring URL and one or more names stored in the database of memory 26, indicating that the customer has just come from a competitor's web site, controller 24 will customize the web page that will be displayed to the user via web server 20 by adding additional information to the web page. For example, the web page can be modified by adding an electronic coupon or special promotional offers for specific products of the vendor. The specific products could be determined based on the name of the competitor matched with the database in memory 26. Thus, for example, if the customer comes from the web site of a customer that sells desktop computers, a coupon or promotional offer for a desktop computer could be displayed on the web page from web server 20.

The customization of the web site according to the present invention can also be done if the customer arrives at the web site via a search engine. Suppose, for example, a search engine such as "www.altavista.com" is utilized to search the WWW by the customer. The referring URL reported to web server 20 will include the search engine information and the search string. For example, a referring URL may appear as:

http://www.altavista.com/cgi-bin/query?pg=q&kl=XX&q=laptop+editors+choice&search=Search Controller 24 will parse the search string to determine the search terms used by the customer. In the above example, the customer used the terms "laptop," "editors," and "choice" in the search. Controller 24 would then cause web server 20 to return to the customer a persistent client state object having a unique identifier therein, also known as a "cookie," noting that the customer is interested in laptops. The information stored in the cookie could be used if the customer makes a subsequent request for the vendor's web page to provide the vendor with information concerning the customer.

Controller 24 would then compare the terms used in the customer's search to terms stored in database of memory 26. The terms stored in database of memory 26 would be predetermined based on products and services offered by the vendor.

If a match is made between a term included in the referring URL and one or more terms stored in the database of memory 26, controller 24 will customize the web page that will be displayed to the user via web server 20 by adding additional information to the web page. For example, the web page can be modified by adding an electronic coupon or special promotional offer for a specific product of the vendor related to the matched term. Thus, in the above example, a coupon or promotional offer for laptop computers could be displayed on the web page transmitted from web server 20.

As an alternative to adding a coupon or special promotional offer as described above, in accordance with the present invention the web page could be modified to contain additional links to other related pages or information. For example, in the example above in which the customer used the term "laptop" in his search, the web page transmitted by web server 20 to user terminal 10 could be modified to include links to special laptop pages of the web site, or an alternate page more appropriate to the customer's needs could automatically be displayed.

Figure 3:
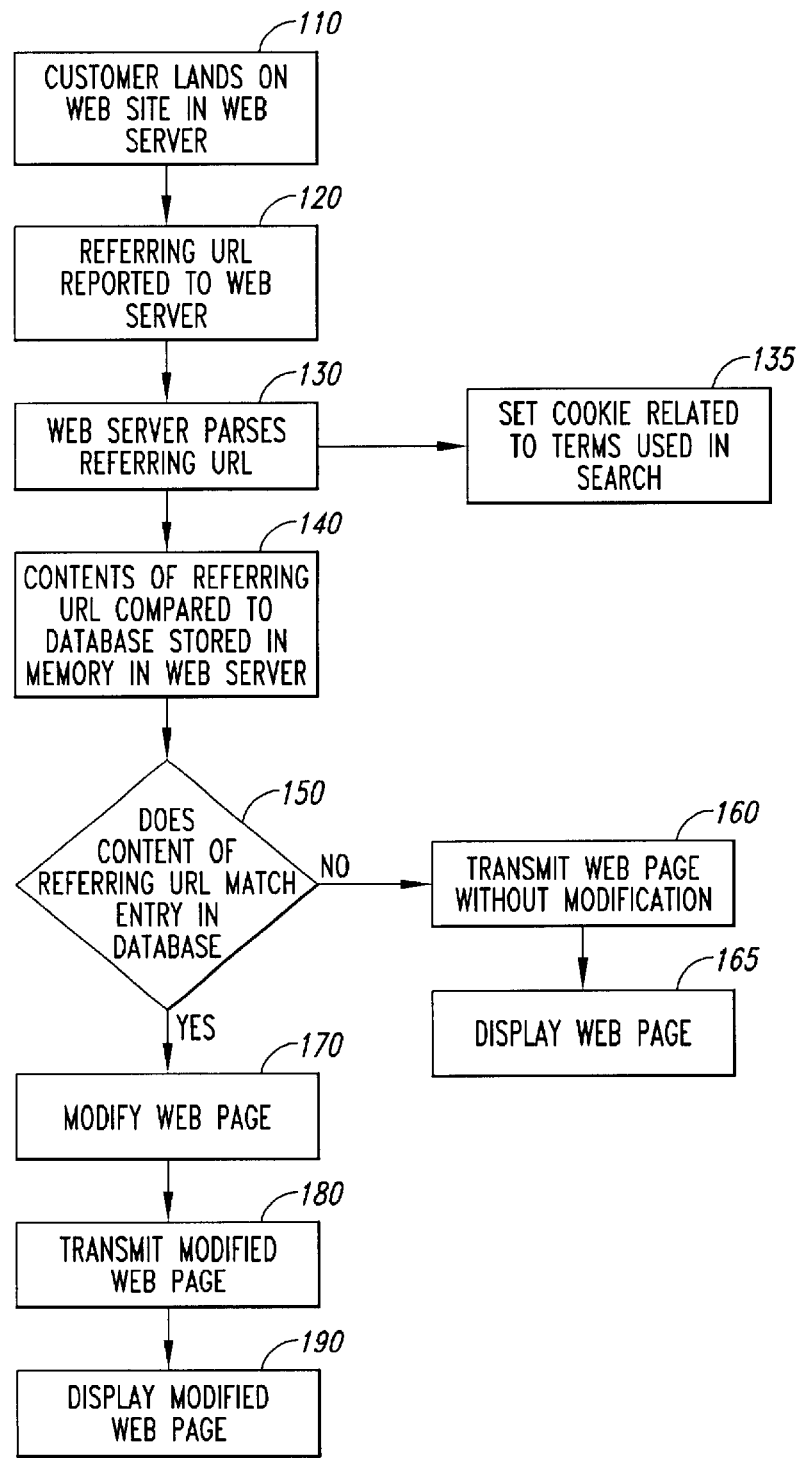
FIG. 3 is a flow chart illustrating one embodiment of an exemplary process for automatically customizing a web page in accordance with the present invention.

FIG. 3 is a flow chart illustrating one embodiment of an exemplary process having elements 110 through 190 for automatically customizing a web page in accordance with the present invention. At 110, a web customer lands on a web site that is supported by web server 20. At 120, the customer's browser reports customer data, such as for example the referring URL, to web server 20 thus allowing web server 20 to track the navigation path of the customer on the WWW.

In accordance with the present invention, when the referring URL is reported to web server 20, controller 24 parses the referring URL and examines the contents of the parsed URL at 130. If the customer arrives via a search engine, at 135 web server 20 can set a cookie for the customer noting that the customer is interested in terms used in the search. At 140, the contents of the referring URL are compared to the contents of a database stored in memory 26 of web server 20. At 150, it is determined if the content of the referring URL matches an entry stored in the database in memory 26. The contents of the database in memory 26 is predetermined and can be based on the names of competitor's web sites, specific types of products, or other information that may be found in a referring URL relating to goods or services the vendor offers.

If the content of the referring URL does not match one or more entries in the database, at 160 the web page is transmitted without customizing or modifying the contents of the web page and displayed via user terminal 10 at 165. If the content of the referring URL matches one or more entries in the database, thus indicating that the customer has just come from a competitor's web site or used a specific term relating to goods or services offered by the vendor in a search, at 170 the web page requested by the customer is modified to customize it specifically for that customer. For example, the web site can be modified by adding an electronic coupon or special promotional offer for a specific product of the vendor related to the matched term or name as described above with respect to FIG. 2. At 180, the modified web page is transmitted to the web customer via web server 20, where it may be displayed via user terminal 10 at 190.

Thus, in accordance with the present invention, a web page in a vendor's web site can be automatically customized based on a customer's previous location or terms used in a search by the customer to provide incentives for the customer to remain in that vendor's web site and purchase goods or services from that vendor.

While the invention has been described in detail in connection with the preferred embodiment known at the time, it should be readily understood that the invention is not limited to such disclosed embodiment. Rather, the invention can be modified to incorporate any number of variations, alterations, substitutions or equivalent arrangements not heretofore described, but which are commensurate with the spirit and scope of the invention. Also, although the invention is preferably implemented in software running on a server, it or portions thereof may be implemented in software, hardware, or any combination of the two. All are deemed equivalent with respect to the operation of the invention. Accordingly, the invention is not to be seen as limited by the foregoing description, but is only limited by the scope of the appended claims.

What is claimed as new and desired to be protected by Letters Patent of the United States is:

1. A method for modifying a requested web page at a vendor website comprising:

receiving customer data when a customer requests said web page, wherein requesting said web page includes a customer linking to the website using a method selected from a group comprising, directly entering a vendor universal resource locator ("URL"), and clicking on a vendor link displayed as a search result;

parsing said customer data into at least a first term;

comparing said at least first term of said parsed customer data with preselected names of competitors' websites, said preselected names being stored in a vendor database;

comparing at least a second term of said parsed customer data with preselected names of product types stored in said vendor database;

if said at least first term of said parsed customer data matches at least one of said preselected names of competitors' websites stored in said vendor database, and if said at least second term of said parsed customer data matches at least one of said preselected names of product types stored in said vendor database, modifying said web page to display information related to said at least first term and said at least second term of said parsed customer data; and transmitting said modified web page to said customer.

2. The method according to claim 1, where the act of modifying includes displaying a promotional offer for a product related to at least one of said first term and said second term.

3. The method according to claim 2, wherein the act of displaying includes displaying a coupon for said product.

4. The method according to claim 1, wherein the act of modifying includes displaying a link to a second web page related to at least one of said first term and said second term.

5. The method according to claim 1, wherein the act of receiving customer data includes receiving a referring URL.

6. The method according to claim 5, wherein the act of receiving a referring URL includes receiving search terms used by said customer.

7. The method according to claim 1, further comprising:

setting a code for said customer related to said parsed customer data.

8. A method for automatically customizig a web page at a vendor website based on a website previously visited by a customer, said method comprising:

determining an address of said website previously visited by said customer when said customer requests said web page, wherein the act of determining includes receiving data including at least a first term and a referring URL for said website previously visited by said customer;

comparing said address of said website previously visited to at least one preselected address for a website of a competitor, said at least one preselected address for a website of a competitor being stored in a vendor database;

comparing the at least first term with preselected names of product types stored in said vendor database;

customizing said web page to display information related to said address of said website previously visited if said address of said website previously visited matches said at least one address for a website of a competitor stored in said vendor database, and if said at least first term matches at least one of said preselected names of product types stored in said vendor database; and transmitting said customized web page to said customer.

9. The method according to claim 8, wherein the act of determining includes:

receiving data for said website previously visited by said customer; and parsing said data to determine said address of said website previously visited by said customer.

10. The method according to claim 8, wherein the act of customizing includes:

displaying a promotional offer for a product similar to a product offered by said competitor.

11. The method according to claim 10, wherein the act of displaying includes:

displaying a coupon for a product similar to a product offered for sale by said competitor.

12. A method for customizing a web page of the world wide web for a customer arriving at said web page from a search engine, said method comprising:

receiving a referring universal resource locator ("URL") when said customer requests said web page, said URL including a search string comprising at least one term input by said customer to said search engine for performing a search of said world wide web;

parsing said search string into at least a first term;

comparing said at least first term with at least one term of a preselected name of a competitor's website stored in a vendor database;

comparing at least a second term of said parsed search string with preselected names of product types stored in said vendor database;

if said at least first term matches said at least one term in said preselected name of a competitor's website stored in said vendor database, and if said at least second term matches at least one of said preselected names of product types stored in said vendor database, modifying said web page to display information related to said at least first term and said at least second term of said parsed search string; and transmitting said modified web page to said customer.

13. The method according to claim 12, wherein said act of modifying includes displaying a promotional offer for a product related to said at least second term.

14. The method according to claim 13, wherein the act of displaying includes displaying a coupon for said product.

15. The method according to claim 12, wherein said act of modifying includes displaying a link to a second web page related to at least one of said at least first term and said at least second term.

16. The method according to claim 12, further comprising:

setting a cookie for said customer related to said parsed search string.

17. A vendor web server for displaying at least one web page to a customer over the world wide web, said vendor web server comprising:

a controller; and a memory connected to said controller, wherein said controller is adapted to parse at least one received customer universal resource locator ("URL") into at least a first search term used by said customer, compare said at least first search term of said parsed customer URL with at least one preselected name of a competitor's website stored in said memory, compare at least a second search term of said parsed customer URL with preselected names of product types stored in said memory, and if said at least first search term of said parsed customer URL matches said at least one preselected name of a competitor's website stored in said memory, and if said at least second search term matches at least one of said preselected names of product types stored in said memory, modify said at least one web page to display information related to said at least first search term and said at least second search term of said parsed customer URL.

18. The web server according to claim 17, wherein said controller is further adapted to display on said web page a promotional offer for a product related to said at least second term of said parsed customer URL that matches said at least one of said preselected names of product types stored in said memory.

19. The web server according to claim 18, wherein said promotional offer is a coupon for said product.

20. The web server according to claim 17, wherein said controller is further adapted to display a link on said web page to another web page related to said at least first term of said parsed customer URL that matches said at least one preselected name of a competitor's website stored in said memory.

21. The web server according to claim 17, wherein said at least one preselected name of a competitor's website stored in said memory includes an address of a competitor's website.

22. The web server according to claim 17, wherein said at least one preselected name of a competitor's website stored in said memory includes a name of a competitor.

23. The web server according to claim 17, wherein said customer URL includes a referring URL.

24. The web server according to claim 23, wherein said referring URL includes at least one search term used by said customer to search said world wide web.

25. The web server according to claim 17, wherein said controller includes a processor.

26. The web server according to claim 25, wherein said processor includes a microprocessor.

27. The web server according to claim 17, wherein said controller is further adapted to set a cookie for said customer related to said parsed customer data.

* * * * *